INVENTORS
ROBERT W. WILSON &
BY OLIVER R. ROWE

Parrott & Richards
ATTORNEYS

INVENTORS
ROBERT W. WILSON &
BY OLIVER R. ROWE

Parrott & Richards
ATTORNEYS

July 12, 1960   R. W. WILSON ET AL   2,944,495
PLANT SETTING MACHINE

Filed Aug. 6, 1956   7 Sheets-Sheet 5

INVENTORS
ROBERT W. WILSON &
BY  OLIVER R. ROWE

Parrott & Richards
ATTORNEYS

July 12, 1960

R. W. WILSON ET AL 2,944,495

PLANT SETTING MACHINE

Filed Aug. 6, 1956

INVENTORS
ROBERT W. WILSON &
OLIVER R. ROWE
BY
Parrott & Richards
ATTORNEYS

United States Patent Office 2,944,495
Patented July 12, 1960

2,944,495
PLANT SETTING MACHINE
Robert W. Wilson and Oliver R. Rowe, Charlotte, N.C., assignors to R. H. Bouligny, Inc., a corporation of North Carolina Filed Aug. 6, 1956, Ser. No. 602,107

12 Claims. (Cl. 111—2)

This invention relates generally to means for transplanting or setting plants, and in particular provides an improved plant setting machine incorporating an advantageous arrangement for handling plants as they are picked up and set, together with means for adjusting, and driving, and carrying the setting means in an especially practical and convenient manner.

These and other features of the present invention are described in detail below in connection with the accompanying drawings, in which.

Figure 1:
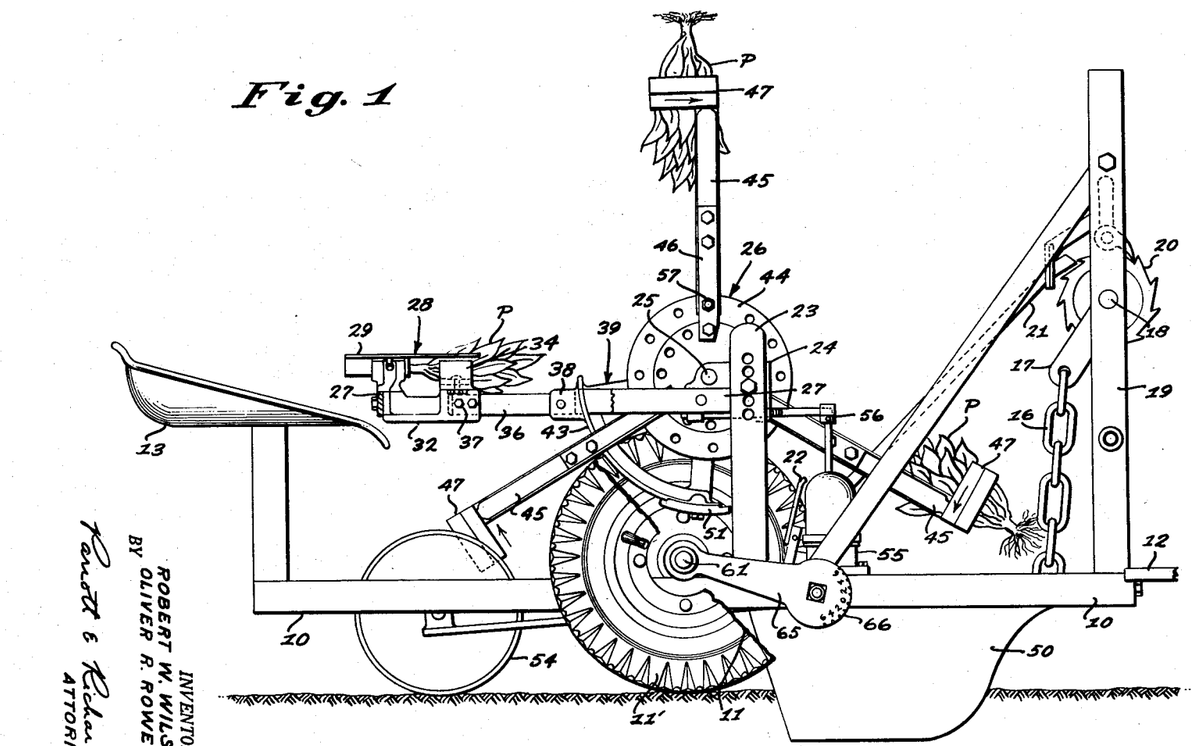
Fig. 1 is a side elevation, partly cut away and partly in section, of a plant setting machine arranged in accordance with the present invention.
Figure 2:
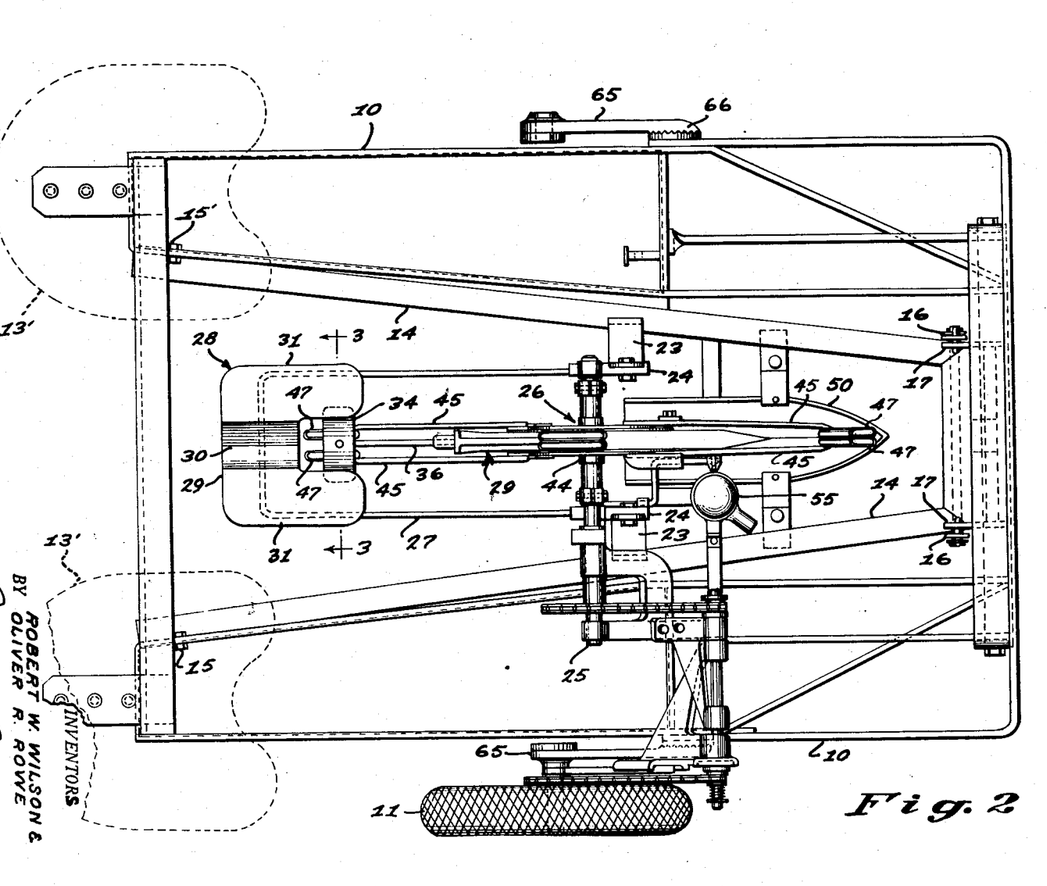
Fig. 2 is a plan view corresponding generally to Fig. 1.

Referring now in detail to the drawings, and more particularly at first to Figs. 1 and 2, the illustrated embodiment of the present invention comprises a plant setting machine having a main frame structure 10 carried on ground wheels 11 and 11' with a suitable hitch bar 12 arranged at its forward end and riding seats 13 and 13' arranged rearwardly at each side thereof.

A second or inner frame structure 14 is pivotally mounted rearwardly on the main frame 10 at 15 and 15' with the forward end of this second frame 14 arranged for control by a lift mechanism for shifting the elevation thereof with respect to the ground wheels 11 and 11', the lift mechanism suitably comprising chains 16 extended from the forward end of the second frame 14 to rock arms 17 carried on a rock shaft 18 supported by braced uprights 19 arranged at the forward end of the main frame 10, with a ratchet wheel 20 also carried on the rock shaft 18 for actuation through a pawl bar 21 from a foot pedal 22 mounted on the main frame to provide for raising and lowering the second frame 14 therefrom as desired.

The second frame 14 has uprights 23 mounted thereon intermediate its length for carrying support blocks 24 forming bearings for a transverse shaft 25 on which a plant setting means is mounted as indicated generally by the reference numeral 26. The support blocks 24 also carry a supporting yoke 27 on which a plant supporting means is arranged, as indicated generally by the reference numeral 28, for disposing a plant P to be picked up by the setting means 26 as is explained further below.

Figure 3:
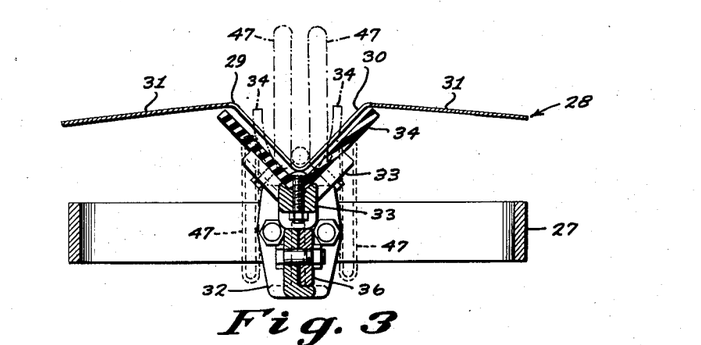
Fig. 3 is an enlarged sectional detail of the plant supporting means taken substantially on the line 3—3 in Fig. 2.
Figure 4:
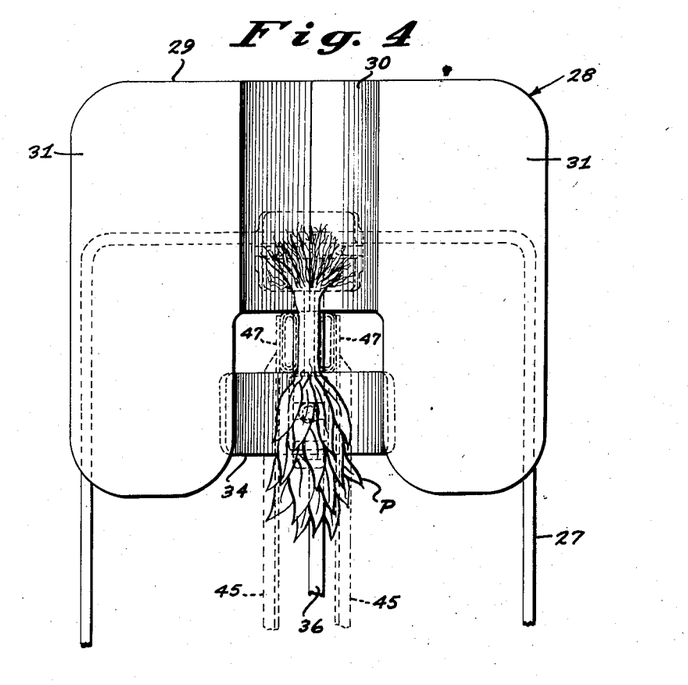
Fig. 4 is a plan view corresponding generally to Fig. 3.

The plant supporting means 28, which is further illustrated in Figs. 3 and 4, comprises a tray structure 29 forming a plant positioning support, by means such as inclined wall portions adjacent its longitudinal center defining a positioning pocket 30 thereat, for receiving the root portion of a plant P to be set, and having wing portions 31 extending horizontally at each side of the plant support portion 30. The tray structure 29 is mounted on a bracket 32 secured at the rear end of the yoke support 27 and having a V-shaped seat portion at 33 to which the tray structure 29 is secured. The bracket 32 also extends forwardly to carry a resilient support member 34 spaced in alignment with the plant support portion 30 of the tray structure 29 and in turn forming a second plant positioning support or pocket for the top portion of a plant P. The bracket 32 is formed with a second V-shaped seat portion 35 of restricted width at which the resilient support member 34 is secured, this support member 34 comprising a strip, or rectangular block, of resilient material, such as rubber, fixed in place intermediate its length along a transverse axis at the second seat portion 35 of bracket 32 with the end portions thereof inclined upwardly to form the above noted plant top positioning pocket.

The wing portions 31 of the tray structure 29 extend forwardly in spaced parallel relation over the ends of the upwardly inclined portions of the resilient support member 34 so as normally to cover the side edges of the positioning pocket formed by the support member 34 and thereby preventing any part of the top portion of a plant P from hanging over these side edges when placed therein, while leaving the resilient support member 34 free to have the inclined portions thereof flexed inwardly for gathering the top portion of a plant P and permitting an intermediate stalk portion thereof to be grasped readily by the setting means 26 at the spacing between the support member 34 and the tray structure pocket portion 30, as is pointed out further below.

Figure 8:
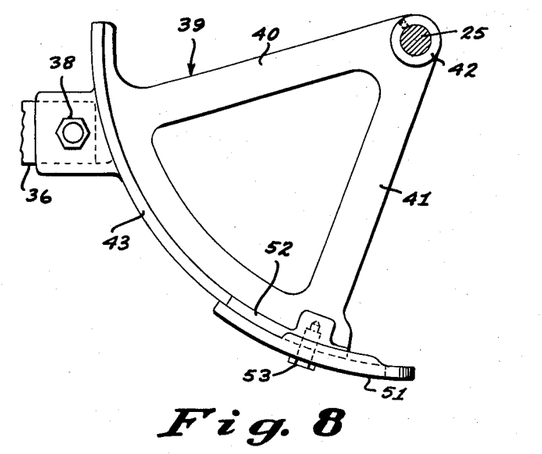
Fig. 8 is a detail in side elevation of the setting means cam structure.
Figure 9:
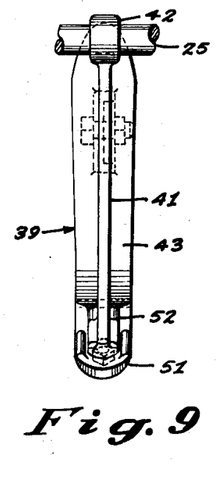
Fig. 9 is a right end view corresponding to Fig. 8.
Figure 10:
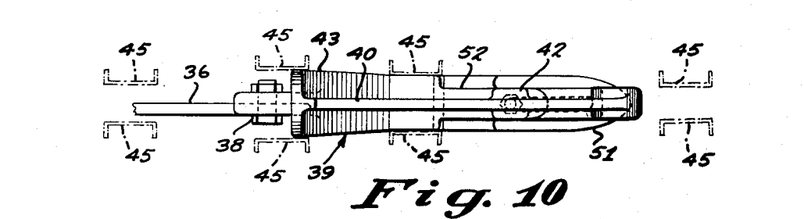
Fig. 10 is a plan view corresponding to Fig. 8.

Support for the bracket 32 at its forward end is provided through a tie bar 36 secured thereto at 37 and extending forwardly for attachment at 38 to a segment cam structure indicated generally by the reference numeral 39. This cam structure 39 (see Figs. 8, 9 and 10) comprises radial arm portions 40 and 41 extending from a hub portion 42, which is mounted to ride freely on the setting means shaft 25, to an arcuate segment cam 43 by which the plant grasping and releasing action of the setting means 26 is controlled.

Figure 5:
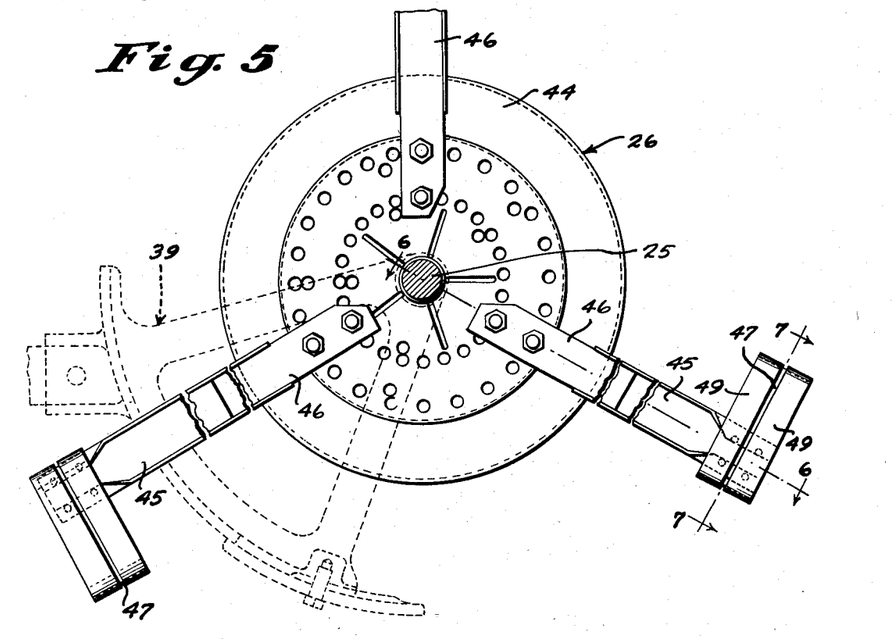
Fig. 5 is a detail in side elevation of the setting means.
Figures 6, 7:
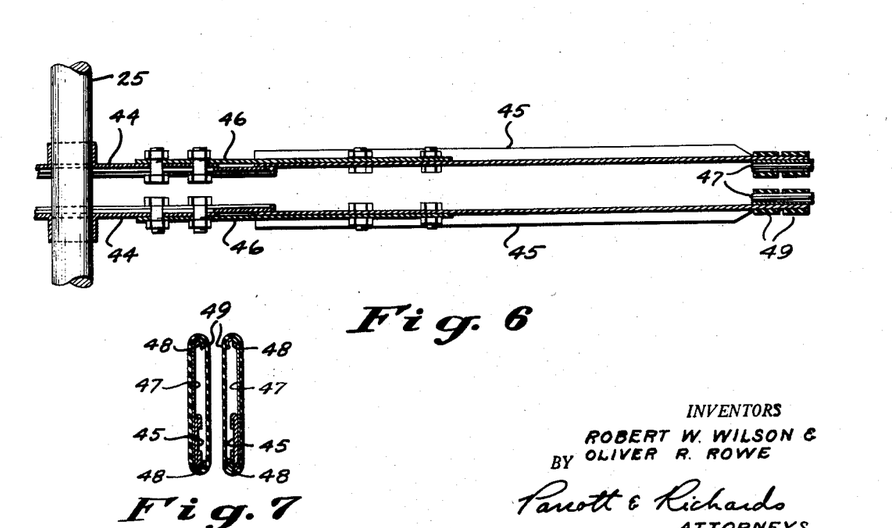
Fig. 6 is a sectional detail taken substantially on the line 6—6 in Fig. 5.
Fig. 7 is a further sectional detail taken substantially on the line 7—7 in Fig. 5.

The setting means 26 otherwise comprises (see Figs. 5, 6 and 7) a pair of circular mounting plates 44 fixed on the setting means shaft 25 to rotate therewith at either side of the cam structure hub portion 42. Each of these mounting plates 44 is formed with a selective pattern of perforations spaced for radial mounting of a given number of planting arms 45 symmetrically thereon in corresponding pairs, the planting arms 45 being attached to the mounting plates 44 by leaf springs 46 which bias the extending ends of the planting arms 45 laterally inward towards each other for riding the segment cam 43 as they are caused to rotate by the setting means shaft 25.

The direction of rotation of the planting arms 45 during operation is clockwise as seen in Fig. 1, and the planting arms 45 are arranged for grasping a plant P to be set between brackets 47 secured at the extending ends of each pair of arms 45 in opposing relation with the brackets 47 extending laterally in the direction opposite the direction of rotation of the arms 45. Each of the laterally extending brackets 47 have the ends thereof flanged toward the opposing bracket as seen best at 48 in Fig. 7, and elastic band members 49 are stretched thereover to present an initially unsupported plant grasping reach between the flanges 48 at the opposing face of each bracket 47, so as to provide a particularly gentle and effective plant grasping action.

The cam structure 39 is arranged so that the planting arms 45 of each pair ride the segment cam portion 43 as they approach the plant supporting means 28 for picking up a plant P disposed thereat to transfer it for setting. The segment cam portion 43 is proportioned to spread each approaching pair of planting arms 45 outwardly against the bias thereon from the leaf springs 46 so as to space the extending planting arm ends to clear the base portion of the support bracket 32 as well as the seat portion 35 thereof on which the resilient support member 34 is mounted; and the radial extent of the planting arms 45 is such as to dispose the elastic band members 49, carried on the brackets 47 at the extending ends thereof, to move through the spacing between the resilient support members 34 and the tray structure pocket portion 30 with which it is aligned.

In moving through this spacing, the planting arms 45 rise under the inclined portions of the resilient support member 34 and act to flex these portions inwardly so that the support member 34 is made to gather the top portion of the plant P disposed thereat. This inward flexing displaces the inclined end portions of support member 34 inwardly from beneath the wing portions 31 of the tray structure 29, and the transverse spacing of these wing portions 31 is such as to allow the planting arms 45 to move upwardly therethrough. Further movement of the planting arms 45 then results in carrying them beyond the resilient support member 34 to release the flexed end portions thereof and at the same time carries the planting arms 34 off of the segment cam 43 so as to allow the arms 45 to close and grasp the intermediate stalk portion of the plant P between the elastic band members 49, which will then be disposed for such grasping because of the previously mentioned trailing disposition of the brackets 47 on which they are carried.

The closed planting arms 45 carrying a plant P grasped thereby at the plant supporting means 28 then continue to rotate clockwise as seen in Fig. 1 until a setting position is reached for releasing the plant P. The setting position is prepared by an opening sword 50 carried on the inner frame structure 14 to form a planting furrow, this opening sword 50 having spaced side portions between which the planting arms 45 move to dispose the plant P carried thereby for setting in the furrow. Release of the plant P at the setting position is effected by the previously mentioned segment cam 43 which operates to open or spread the planting arms 45 and thereby release their grasp on the plant P.

In order to time the spreading of the planting arms 45 properly at the setting position, the segment cam 43 is fitted with an adustable extension shoe or nose 51 which is grooved so as to be slidably keyed at a narrowed length 52 of the segment cam 43 and to be held in place at any selected position thereon by a single fastening stud 53, which allows the extension nose 51 to be adjusted readily and conveniently for properly timed spreading of the planting arms 45 to release the plants P to the best advantage for setting.

After setting of the plants P in this manner a following covering wheel structure 54 is also arranged on the inner frame 14 for closing the furrow and firming up the earth in the usual manner at each side of the plants P that have just been set. A water valve mechanism 55 may also be arranged on the inner frame 14 for actuation through a trip linkage 56 from suitably arranged fastening studs 57 for the planting arms 45 on the adjacent mounting plant 44 to water the furrow prepared by the opening sword 50 at spaced intervals corresponding to the points where the plants P will be set therein.

Figure 15:
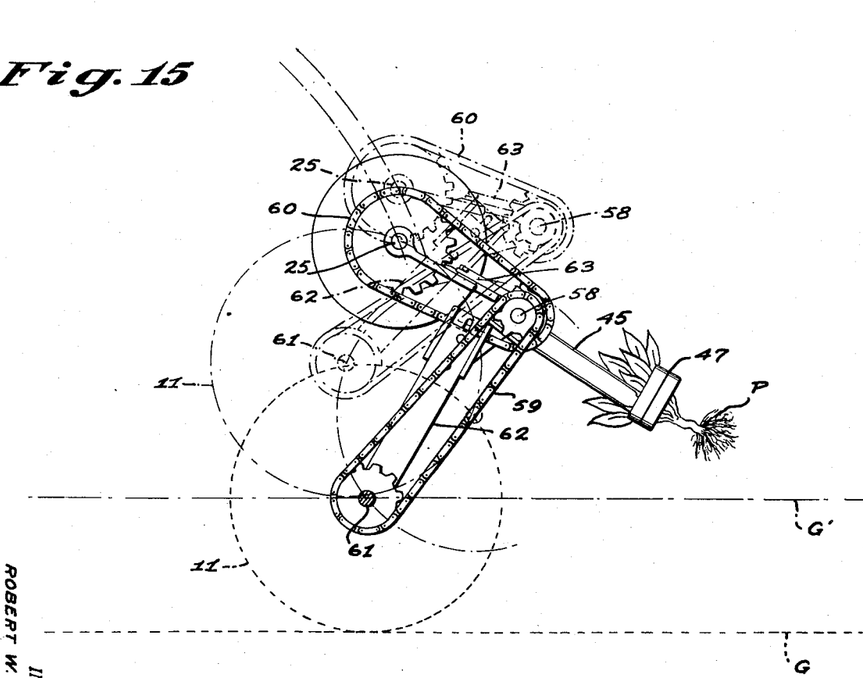
Fig. 15 is a diagrammatic functional illustration of the drive linkage.

Operation of the planting arms 45 in the above described manner is actuated by driving the setting means shaft 25 from one of the ground wheels 11 mounted on the main frame 10. In order to effect such driving while accommodating the pivotal shifting of the inner frame 14 on the main frame 10, the drive linkage provided for this purpose comprises, as shown best in Figs. 14 and 15, a floating stub shaft 58 having the opposite ends thereof fitted with respective drive connections 59 and 60, from the axle 61 of the ground wheel 11, and to the setting means shaft 25 that is to be driven. The support for this floating stub shaft 58 comprises respective support bracket structures 62 and 63 pivotally mounted at the axle 61 of ground wheel 11, and on the driven setting means shaft 25, and forming journal supports for the floating stub shaft 58 between the drive connections 59 and 60. Both of these support bracket structures 62 and 63 are arranged to be longitudinally extensible as indicated at 62' and 63' so as to set the floating stub shaft 58 for properly tensioning the drive connections 59 and 60 thereat. Fig. 15 shows the above described drive linkage in full lines at the position it would assume with the driven shaft 25 (and inner frame 14) raised with respect to a ground level G', and in dotted lines at the related position assumed with the driven shaft 25 lowered in relation to a ground level G'.

It should be noted particularly that the above described arrangement allows sprocket wheels 59' and 60' or the like to be mounted at the ends of the floating stub shaft 58 where they may be changed readily for adjusting the operating speed whenever desired. A clutch mechanism 64 may also be arranged at the floating stub shaft 58 adjacent the drive connection 59 from the ground wheel axle 61 for disconnecting the stub shaft 58 so as to allow the setting means 25 to remain idle during traveling of the plant setting machine with the inner frame 14 raised or whenever otherwise desired.

Figure 11:
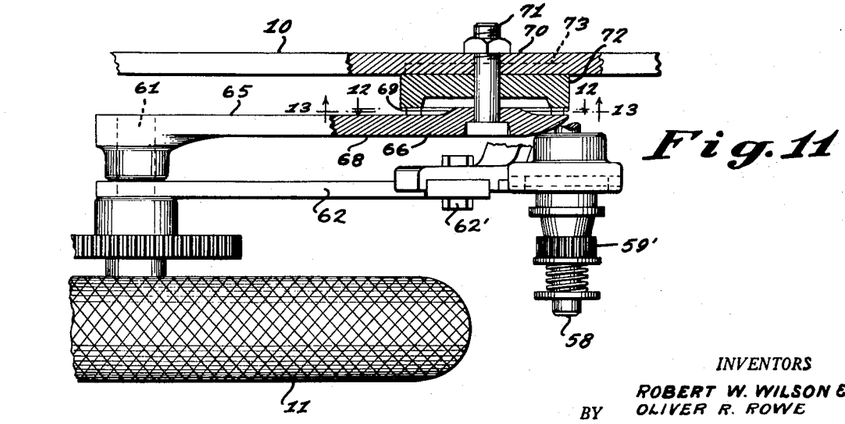
Fig. 11 is a fragmentary plan view illustrating the ground wheel mounting arrangement.
Figures 12, 13, 14:
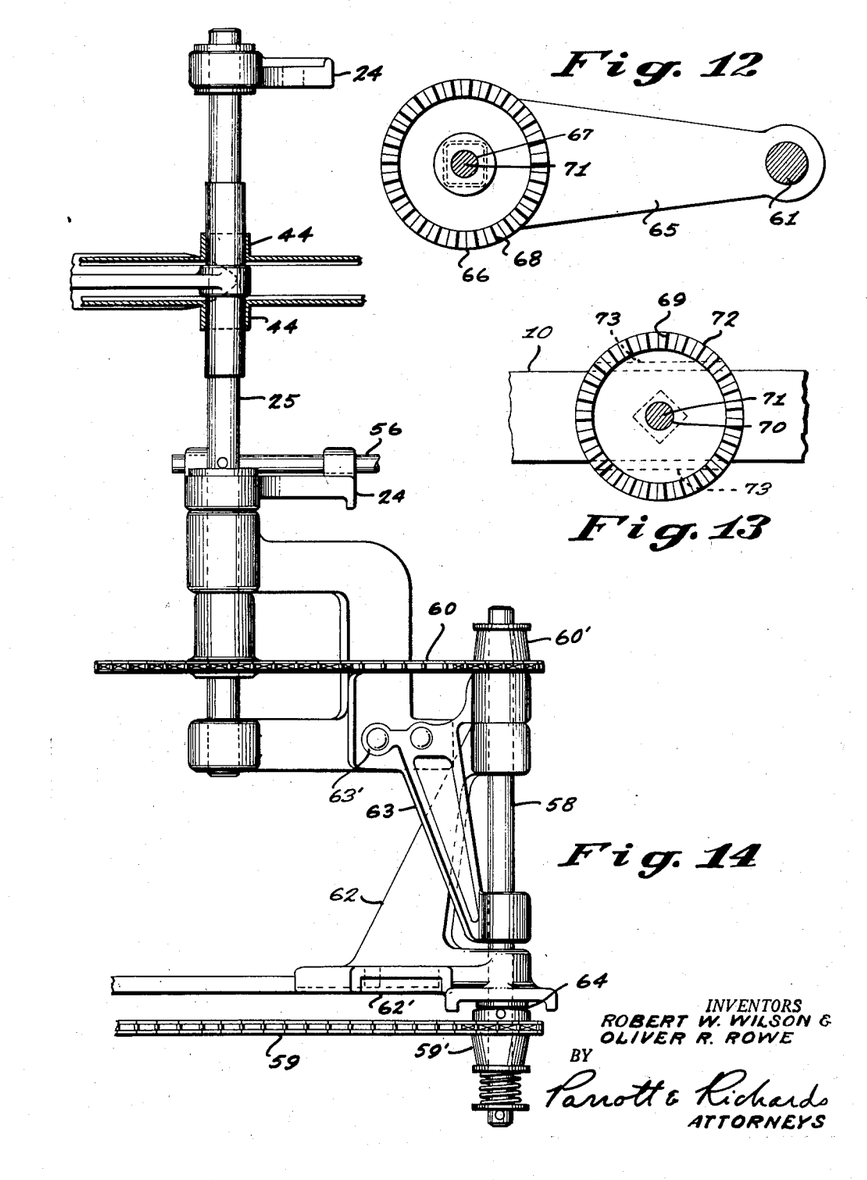
Fig. 12 is a sectional detail taken substantially at the line 12—12 in Fig. 11.
Fig. 13 is a further sectional detail taken substantially at the line 13—13 in Fig. 11.
Fig. 14 is an enlarged fragmentary plan detail of the setting means drive linkage.

The ground wheels 11 and 11' are also arranged according to the present invention so as to provide for easy and convenient adjustment of the riding elevation of the main frame 10, as illustrated in Figs. 11, 12 and 13. For this purpose, each ground wheel, such as 11, has the axle 61 thereof journalled at one end of a supporting arm 65 that has the other end thereof formed with a mounting hub portion 66, in which a central fastening bolt aperture 67 is provided, and at which a face of the hub portion 66 is serrated radially, as indicated at 68, in relation to the fastening bolt aperture 67. The main frame 10 in turn has complementary radial serrations at 69 arranged thereon about a fastening bolt aperture 70 that is registrable with the aperture 67 in the mounting arm hub portion 66 to receive a fastening bolt 71 for extension through the hub portion 66 and main frame 10 to hold the radial serrations 68 and 69 thereat engaged so as to secure the ground wheel 11 on the main frame 10 at a selected supporting height, while allowing adjustment of this supporting height simply by loosening the fastening bolt 71 and shifting the relative engagement of the radial serrations 68 and 69. The complementary radial serrations 69 may be arranged conveniently on the main frame 10 by forming them at one face of a washer member 72 having parallel spaced ribs 73 at the other face thereof for keyed engagement with the main frame 10 when held in place by the fastening bolt 71.

The present invention has been described in detail above for purposes of illustration only and is not intended to be limited by this description or otherwise except as defined in the appended claims.

We claim:

1. In a plant setting machine, the combination with setting means, operating cyclicly for grasping a plant at a pickup station and releasing said plant at a setting position, of means for supporting a plant at said pickup station for grasping by said setting means comprising a tray structure forming a fixed, upwardly facing, positioning support for receiving the root portion of a plant to be set, and a support member formed of resilient material and disposed in spaced alignment with the positioning support formed by said tray structure and in turn forming a positioning support for the top portion of said plant, said resilient support member being arranged in the path of said setting means to present an intermediate stalk portion of said plant for grasping at the spacing between said support member and tray structure and lifting upwardly therefrom, and said setting means operating upwardly at said pickup station to flex said resilient support member for gathering the top portion of said plant and permitting access to said intermediate stalk portion for grasping.

2. In a plant setting machine, plant setting means comprising at least one pair of opposed setting arms mounted radially in spaced relation for rotation about an axis adjacent one end thereof, the radially extending ends of said arms being formed for grasping therebetween a plant to be set and the extending length of said arms being laterally displaceable in a plane including said axis and with respect to the ends thereof adjacent said axis for closing the spacing of said extending ends to grasp a plant and for opening said spacing to release said plant, a relatively rigid tray structure forming a positioning pocket for receiving the root portion of a plant to be set, a support member spaced in alignment with the positioning pocket formed by said tray structure and in turn forming a positioning pocket for the top portion of said plant, said support member being formed of a resilient material and being disposed in the path of rotation of said pair of setting arms to present an intermediate stalk portion of said plant for grasping by the extending ends of said arms at the spacing between said support member and tray structure, said pair of setting arms being biased for closing the extending ends thereof and said setting arms rotating in the direction to lift said plant upwardly from said tray structure and support member and operating to flex said resilient support member for gathering the top portion of said plant and permitting access to said intermediate stalk portion for grasping by the extending ends of said arms upon rotation thereof past said support member, and cam means fixed in relation to the axis about which said setting arms rotate for spreading said pair of setting arms against the bias thereon to release therefrom a grasped plant upon rotation of said arms to a plant setting position and for maintaining said arms spread during continued upward rotation thereof to said tray structure and support member, said cam means being arranged to release said setting arms for grasping said plant under the bias thereon as said arms are rotated upwardly past said support member.

3. In a plant setting machine, the structure defined in claim 2 and further characterized in that said resilient support member comprises a strip of resilient material fixed in place intermediate its length along a transverse axis with the end portions thereof inclined upwardly to form said plant top positioning pocket.

4. In a plant setting machine, the structure defined in claim 3 and further characterized in that said tray structure includes wing portions extending at each side of the positioning pocket formed by said tray structure and reaching over the end edges of the upwardly inclined portions of said support member strip, but being spaced sufficiently to provide clearance for rotation of said setting arms past said support member.

5. In a plant setting machine, the structure defined in claim 2 and further characterized in that the form of said setting arms at the extending ends thereof for grasping a plant to be set comprises a bracket secured at the opposing face of each setting arm to extend laterally in the direction opposite the direction of rotation of said arms, each of said brackets having the ends thereof flanged toward the opposing bracket, and elastic band members stretched over said brackets to present an initially unsupported plant grasping reach between said flanges at the opposing face of each bracket.

6. In a plant setting machine, the structure defined in claim 2 and further characterized in that said laterally displaceable setting arms are carried at the ends thereof adjacent said axis of rotation by spring arms biasing said setting arms toward closing of the extending ends thereof.

7. In a plant setting machine, the structure defined in claim 6 and further characterized in that said fixed cam means is disposed in the path of rotation of said pair of setting arms for opening the extending ends of said arms to release a plant therefrom upon rotation to a plant setting position, for maintaining said arms open during continued rotation thereof to the spacing between said support member and tray structure, and for releasing said arms to close under the bias thereon and grasp another plant thereat.

8. In a plant setting machine, ground wheels supporting said machine, a driven shaft connected for rotation from said ground wheels during travel of said machine, plant setting means carried by said driven shaft comprising pairs of opposed, setting arms mounted radially in regularly spaced relation about said driven shaft for rotation therewith and for lateral displacement in respective plans including the axis of said shaft about the adjacent ends thereof, the setting arms of each pair being formed at the radially extending ends thereof for grasping therebetween a plant to be set and being biased for closing said extending ends to grasp said plant, means for positioning a plant to be grasped by said setting arms at an intermediate stalk portion thereof during upward rotating movement of said setting arms, said positioning means including a support member formed of resilient material for supporting the top portion of said plant in the path of upward rotation of said setting arms, and cam means fixed in relation to said driven shaft for spreading said pairs of setting arms against the bias thereon to release therefrom a grasped plant upon rotation of said arms to a plant setting position and for maintaining said arms spread during continued upward rotation thereof to said plant positioning means for flexing of said resilient support member by said arms and thereby gathering the top portion of a plant thereat as the extending ends of said arms are presented to grasp said plant, said cam means being arranged to release said extending setting arm ends to grasp said plant under the bias thereon as said arms are rotated upwardly past said support member.

9. In a plant setting machine, the structure defined in claim 8 and further characterized in that said cam means is disposed to extend arcuately in relation to said driven shaft and the end thereof facing opposite the direction of rotation of said setting arms is fitted with an adjustable extension shoe for timing the spreading of said setting arms properly at said setting position.

10. In a plant setting machine, a main frame, a second frame carrying plant setting means including a driven shaft for operation, said second frame being pivotally mounted on said main frame for shifting the elevation of said setting means between a raised traveling position and a lowered working position, a ground wheel mounted on said main frame, and means connecting said driven shaft for rotation from said ground wheel comprising a floating stub shaft fitted with respective drive connections from said ground wheel and to said driven shaft and journalled in respective support brackets pivotally mounted on the axle of said ground wheel and on said driven shaft.

11. In a machine of the character described, a main frame, a ground wheel mounted on said main frame, a driven shaft, a second frame carrying said driven shaft and pivotally mounted on said main frame for shifting the elevation of said driven shaft with respect to said ground wheel, and means connecting said driven shaft for rotation from said ground wheel comprising a floating stub shaft having the opposite ends thereof fitted with respective drive connections from said ground wheel and to said driven shaft, and respective support brackets pivotally mounted at the axle of said ground wheel and on said driven shaft and forming journal supports for said stub shaft between said drive connections.

12. In a plant setting machine, ground wheels supporting said machine, a driven shaft connected for rotation from said ground wheels during travel of said machine, plant setting means carried by said driven shaft comprising pairs of opposed, laterally displaceable, setting arms mounted radially in regularly spaced relation about said driven shaft for rotation therewith and for lateral displacement parallel to the axis of said shaft about the adjacent end thereof, the setting arms of each pair being formed at the radially extending ends thereof for grasping therebetween a plant to be set and being biased for closing said extending ends to grasp said plant, means for positioning a plant to be grasped by said setting arms at an intermediate stalk portion thereof during upward rotating movement of said setting arms, said positioning means including a resilient support member formed of resilient material for supporting the top portion of said plant in the path of upward rotation of said setting arms, cam means fixed in relation to said driven shaft for spreading said pairs of setting arms against the bias thereon to release therefrom a grasped plant upon rotation of said arms to a plant setting position and for maintaining said arms spread during continued upward rotation thereof to said plant positioning means for flexing of said resilient support member by said arms and thereby gathering the top portion of a plant thereat as the extending ends of said arms are presented to grasp said plant, said cam means being arranged to release said extending setting arm ends to grasp said plant under the bias thereon as said arms are rotated upwardly past said support member, a fixed frame on which said ground wheels are mounted, a second frame on which said driven shaft is mounted, said second frame being pivotably carried on said first frame for shifting the elevation of said driven shaft with respect to said first frame, and the connection of said driven shaft for rotation from said ground wheels inclduing a floating stub shaft fitted with respective drive connections from one of said ground wheels and to said driven shaft and journaled in respective support brackets pivotally mounted on the axle of said ground wheel and on said driven shaft.

References Cited in the file of this patent
UNITED STATES PATENTS

| | | |
|---|---|---|
| 85,195 | Young | Dec. 22, 1868 |
| 398,754 | Stratton | Feb. 26, 1889 |
| 570,905 | Cheeseman | Nov. 10, 1896 |
| 653,625 | Morgan | July 10, 1900 |
| 1,176,324 | Spurgeon | Mar. 21, 1916 |
| 1,637,980 | Arnold | Aug. 2, 1927 |
| 1,684,017 | Durepo | Sept. 11, 1928 |
| 2,651,405 | McGowan | Sept. 8, 1953 |
| 2,728,582 | Knarzer | Dec. 27, 1955 |
| 2,779,602 | Kimbro et al. | Jan. 29, 1957 |